No. 861,342.                                              PATENTED JULY 30, 1907.
O. WINTER.
PISTON RING CONTRACTOR.
APPLICATION FILED APR. 18, 1907.
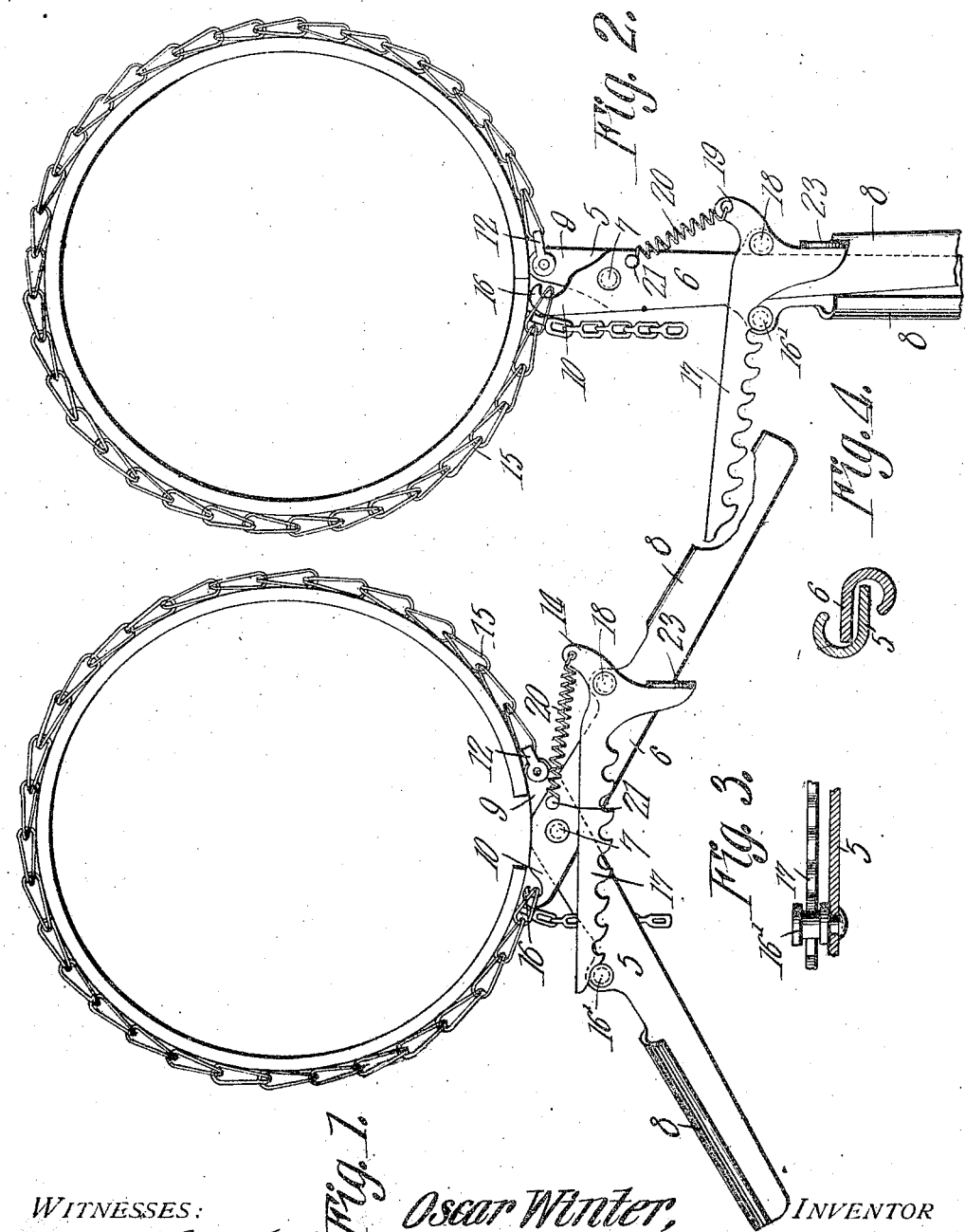
WITNESSES:                    Oscar Winter, INVENTOR
                                By
                                         ATTORNEYS

UNITED STATES PATENT OFFICE.

OSCAR WINTER, OF ELYRIA, OHIO.

PISTON-RING CONTRACTOR.

No. 861,342.  Specification of Letters Patent.  Patented July 30, 1907.

Application filed April 18, 1907. Serial No. 368,937.

*To all whom it may concern:*

Be it known that I, OSCAR WINTER, a citizen of the United States, residing at Elyria, in the county of Lorain and State of Ohio, have invented a new and useful Piston-Ring Contractor, of which the following is a specification.

This invention relates to piston ring contracting tools, and has for its principal object to provide a tool of simple and economical construction by which the packing rings of pistons, plungers and like members may be contracted in order to permit the ready introduction of such members into their cylinders.

A further object of the invention is to provide a device of this class in which the piston ring when compressed may be locked in place, and during the introduction of the piston into the cylinder the tool will become detached by engagement with the end of the cylinder.

A still further object of the invention is to provide a tool of this class in which the spaced ends of the piston ring may be brought into proper relative position and held from springing outward beyond the periphery of the piston.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation of a piston ring contracting tool constructed in accordance with the invention, showing the tool in open position. Fig. 2 is a similar view showing the work engaging arms in contracted position. Fig. 3 is a transverse sectional view looking in the direction of the arm of Fig. 1. Fig. 4 is a similar view showing the two handles in closed position.

Similar numerals of reference are employed to indicate corresponding parts throughout the several figures of the drawings.

The improved tool comprises a pair of laterally movable jaws 5 and 6 which are pivotally connected by a pin 7 and each jaw is preferably formed of a single piece of flat steel having one longitudinal edge thereof curved to form an operating handle 8.

The pivoted jaws 5 and 6 are provided with extending arms 9 and 10, respectively, the ends of said arms being rounded and forming cams which engage with the end portions of the ring being contracted and serve to guide the ends of the rings during the contracting operation.

To the arm 9 is pivoted a shackle 12 and to this shackle is secured one end of a flexible member 15 that preferably is in the form of a chain. The opposite arm 10 is cut away to form a hook, the bill 16 of which may enter any one of the links of the chain, so that the device may be applied to piston rings of different diameter.

Mounted on the arm 5 is a pin or roller 16' having an annular groove for the reception of a toothed locking rack 17 that is pivoted on a pin 18 carried by the opposite arm, the teeth of the rack being rounded, so that they may ride freely over the roller during the operation of contracting the ring. The rack is provided with an upwardly extending arm 19 which is connected to a fixed stud 21, by means of a tension spring 20, and below the arm is a finger piece 23 which may be depressed for the purpose of moving the rack from engagement with the locking pin 16'.

In mounting the device, the arms are opened to the fullest extent, as indicated in Fig. 1, it being noted that the two arms 9 and 10 will, in this position, follow approximately the curvature of the piston ring and will serve in a measure as guides for retaining the ends of the ring in proper position during the contracting operation. The chain is passed around the ring when in expanded position and one of the links of the chain is passed over the bill 16. The operator then grasps the handles, and forces said handles together, for the purpose of drawing the chain closely around the ring, and during this operation the rounded ends of the arms will ride against the end portions of the ring and will prevent the same from springing outward, so that the ends of said ring may be brought together, and the ring as a whole contracted to the position shown in Fig. 2. After the ring has been fully contracted within the piston groove and the handles have been locked in the manner shown in Fig. 2, the tool is allowed to remain on the ring, and both hands of the operator are then free to introduce the piston into the cylinder. During this latter operation, the chain will be engaged by the end wall of the cylinder after the ring has been partly introduced, and as the piston continues its movement, the tool will be gradually forced from the ring on to the piston proper, and then may be readily unlocked and detached for use, if necessary, on a second or third ring, if required.

With a device constructed in accordance with this invention, the piston rings may be contracted to any desired extent, and may be locked in position in such manner as to prevent the automatic removal of the tool as the piston is being forced into the cylinder.

I claim:—

A piston ring contracting tool comprising a pair of pivotally connected arms, the inner ends of which are rounded to form cam surfaces for engagement against the outer face of the piston ring, one of said arms being shaped to form an inwardly bent bill, a shackle pivotally connected to the other arm, a chain having one end connected to the shackle, anyone of the links of the opposite end of the chain being arranged to be engaged by the hook, a pivotally mounted lock bar carried by one of the arms and provided with a locking rack, a pin carried by the other arm and arranged to be engaged by the teeth of such rack, and a spring tending to hold the rack in engagement with the pin, substantially as specified.

In testimony that I claim the foregoing as my own, I have hereto affixed my signature in the presence of two witnesses.

OSCAR WINTER.

Witnesses:
A. E. LAURENCE,
L. D. HAMLIN.